United States Patent
Lakic

(10) Patent No.: US 10,118,579 B2
(45) Date of Patent: Nov. 6, 2018

(54) IMPACT ENERGY ABSORBING DEVICE FOR A VEHICLE

(71) Applicant: Jaguar Land Rover Limited, Coventry, Warwickshire (GB)

(72) Inventor: Alex Lakic, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 15/528,898

(22) PCT Filed: Jan. 28, 2016

(86) PCT No.: PCT/EP2016/051815
§ 371 (c)(1),
(2) Date: May 23, 2017

(87) PCT Pub. No.: WO2016/120390
PCT Pub. Date: Aug. 4, 2016

(65) Prior Publication Data
US 2017/0327066 A1  Nov. 16, 2017

(30) Foreign Application Priority Data

Jan. 28, 2015 (GB) .................................. 1501399.8

(51) Int. Cl.
*B60R 19/34* (2006.01)
*B60R 19/26* (2006.01)

(52) U.S. Cl.
CPC ........ *B60R 19/34* (2013.01); *B60R 2019/264* (2013.01)

(58) Field of Classification Search
CPC .......... B60R 19/24; B60R 19/26; B60R 19/34

USPC ................................................... 293/132, 133
See application file for complete search history.

(56) References Cited

U.S. PATENT DOCUMENTS

| | | | |
|---|---|---|---|
| 2011/0193370 A1* | 8/2011 | Klimek | B60R 19/34 296/187.09 |
| 2011/0316307 A1* | 12/2011 | Di Modugno | B60R 19/34 296/187.03 |
| 2013/0127191 A1* | 5/2013 | Zannier | B60R 19/03 293/133 |

(Continued)

FOREIGN PATENT DOCUMENTS

| | | |
|---|---|---|
| EP | 2156990 A1 | 2/2010 |
| FR | 2980145 A1 | 3/2013 |

(Continued)

OTHER PUBLICATIONS

Combined Search and Examination Report, GB Application No. 1501399.8, dated Jun. 1, 2015, 6 pages.

(Continued)

*Primary Examiner* — Jason S Daniels
(74) *Attorney, Agent, or Firm* — Myers Bigel, P.A.

(57) ABSTRACT

An impact energy absorbing device for a vehicle includes a plurality of cells that are grouped together to form a matrix structure defining a mounting region and a contact region. The cells crush along their respective longitudinal axes when exposed to an impact force on the contact region. Each of the longitudinal axes of the plurality of cells in the matrix structure diverges with respect to neighboring cells in a direction from the mounting region to the contact region.

16 Claims, 13 Drawing Sheets

(56) References Cited

U.S. PATENT DOCUMENTS

2013/0292969 A1* 11/2013 Metzner ............... B62D 21/152
296/187.09

FOREIGN PATENT DOCUMENTS

JP         2014004973 A     1/2014
WO     WO 92/07734 A2    5/1992

OTHER PUBLICATIONS

Notification of Transmittal of the International Search Report and the Written Opinion of the International Searching Authority, or the Declaration, PCT/EP2016/051815, dated Apr. 26, 2016.

* cited by examiner

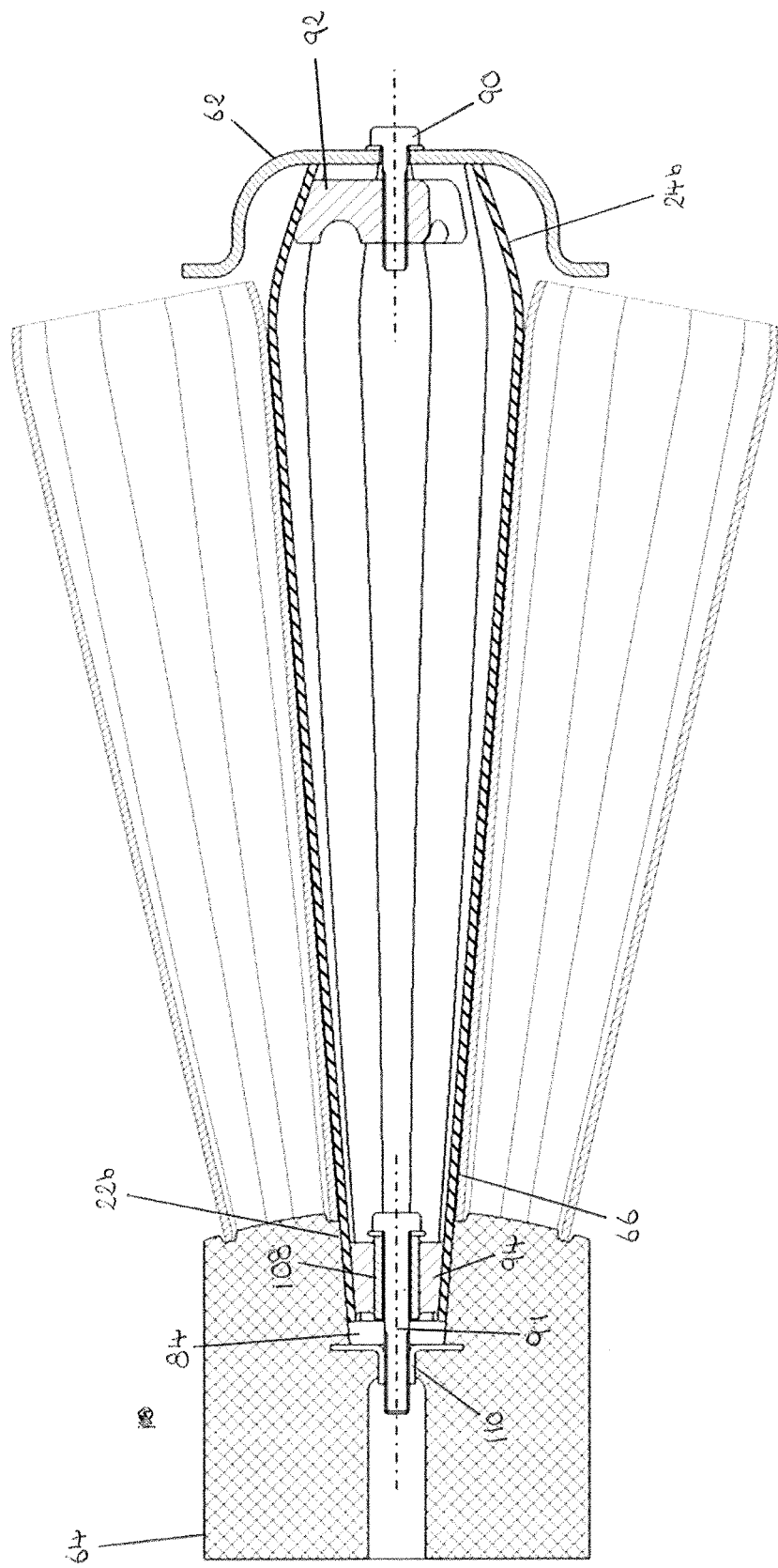

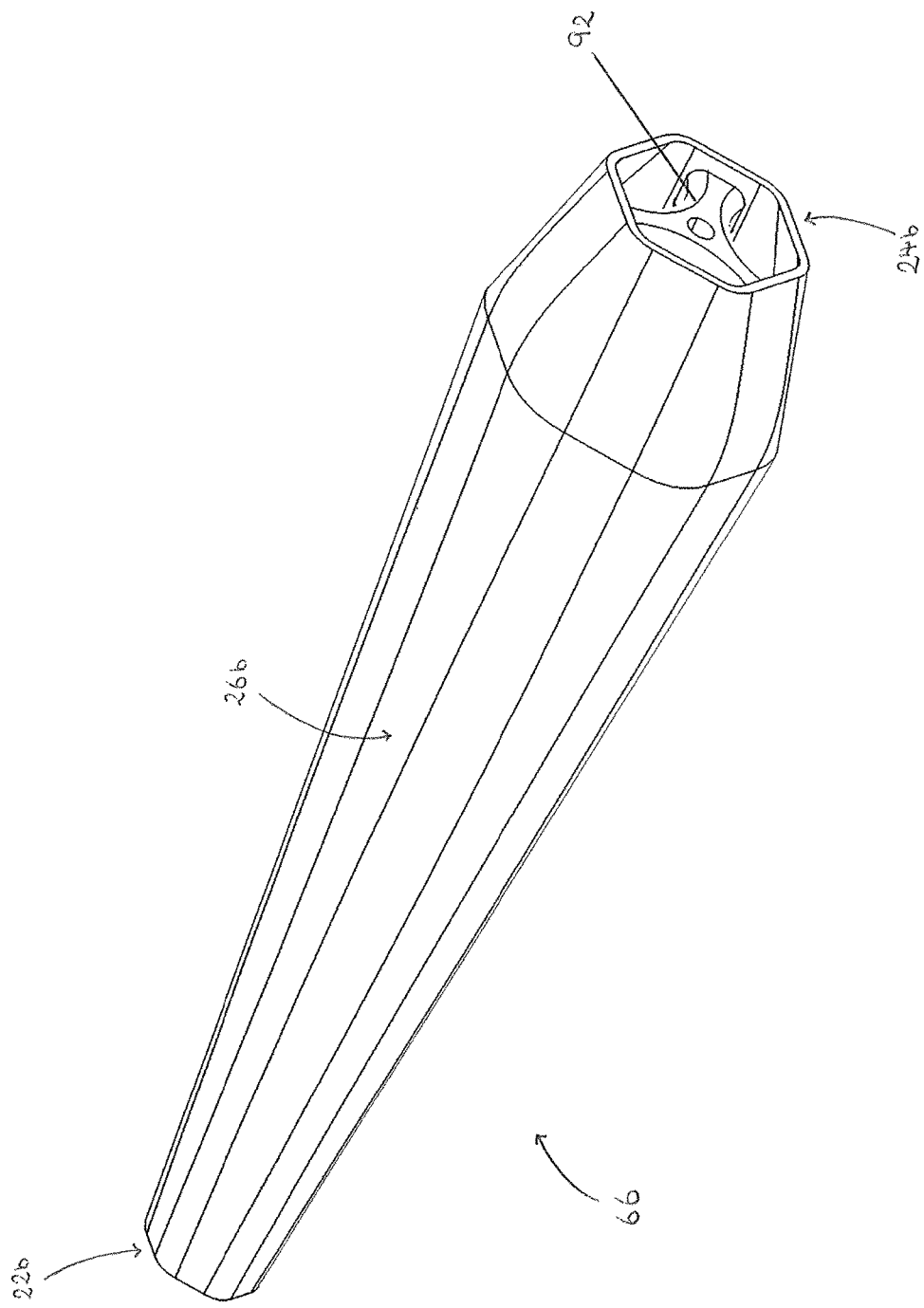

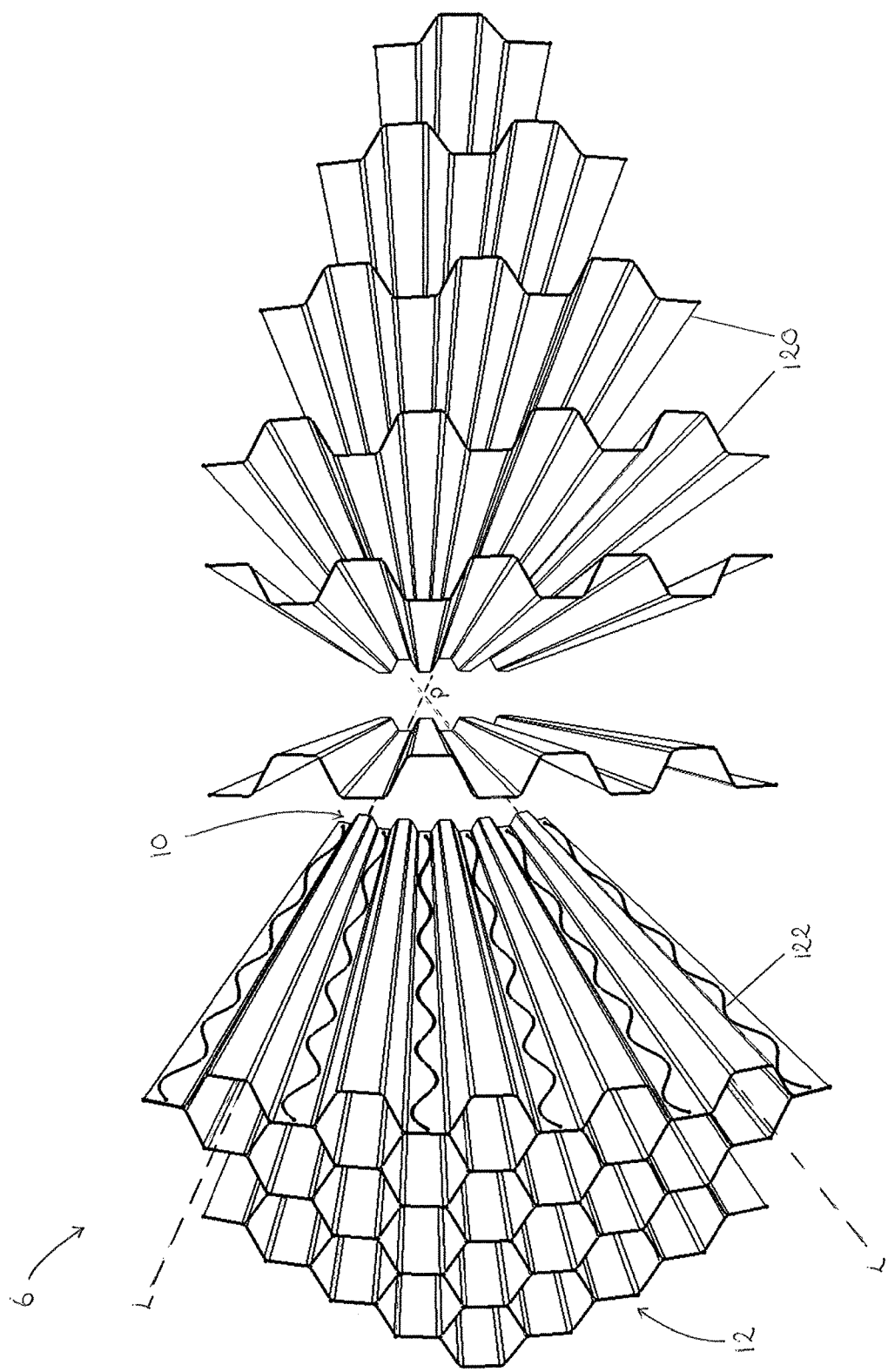

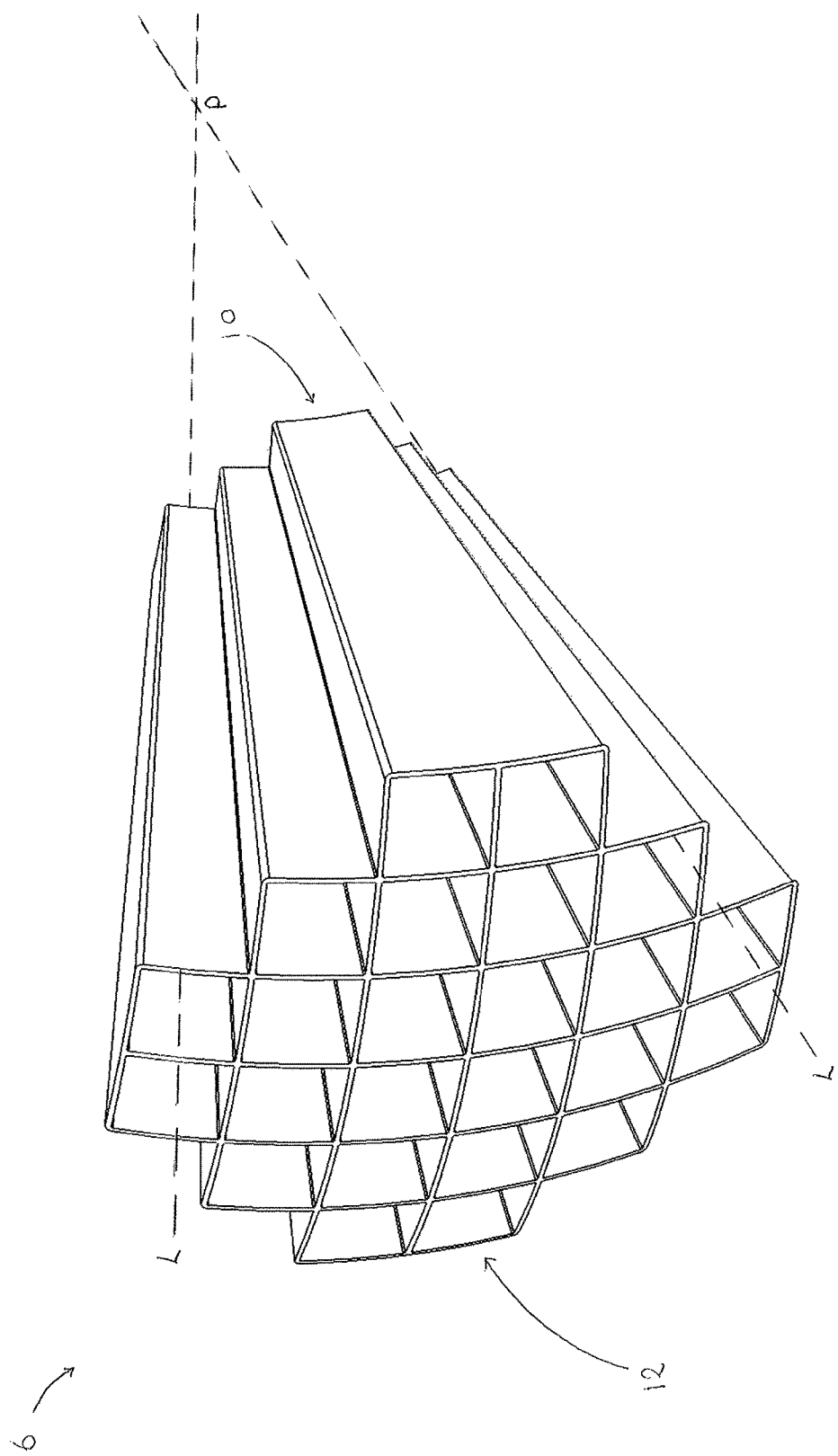

IMPACT ENERGY ABSORBING DEVICE FOR A VEHICLE

RELATED APPLICATIONS

This application is a 35 U.S.C. § 371 national stage application of PCT Application No. PCT/EP2016/051815, filed on Jan. 28, 2016, which claims priority from Great Britain Patent Application No. 1501399.8 filed on Jan. 28, 2015, the contents of which are incorporated herein by reference in their entireties. The above-referenced PCT International Application was published in the English language as international Publication No. WO 2016/120390 A1 on Aug. 4, 2016.

TECHNICAL FIELD

The present disclosure relates to an impact energy absorbing device for a vehicle and particularly, but not exclusively, to a sacrificial crash protection device for absorbing energy from impacts across a range of angles. Aspects of the invention relate to a device, to a vehicle structure component and to a vehicle.

BACKGROUND

Passenger vehicles are often provided with at least one sacrificial crash protection device mounted between the bumper and the structural frame of the vehicle. Such devices are sometimes referred to in the art as 'crush cans' or 'crash boxes'. Crash boxes are designed to absorb energy from the impact of a low speed traffic collision by controlled permanent deformation, or 'crushing'. This reduces the amount of energy that is transferred to the structural frame of the vehicle and minimises damage to other components of the vehicle, especially in low speed impacts.

A typical crash box takes the form of a tapered tube having its major axis running parallel to the longitudinal centreline of the vehicle. The tube is wider where it is mounted to the structural frame of the vehicle and has a relatively narrow distal end where it is connected to the bumper. The cross-section of the tube can be almost any shape, but is typically a rectangle or circle.

A tapered tube is effective at absorbing energy from impacts along its major axis. However, even at small angles of inclination the crash box may bend or buckle about the longitudinal axis rather than crush and collapse along its longitudinal axis, making it less effective at absorbing energy. It would therefore be beneficial to design an energy absorbing device for a vehicle that is capable of more effectively absorbing energy from impacts across a range of angles.

SUMMARY OF THE INVENTION

Aspects and embodiments of the invention provide a device, a vehicle structure component and a vehicle, as claimed in the appended claims.

According to an aspect of the invention, there is provided an impact energy absorbing device including a plurality of cells that are grouped together to form a matrix structure defining a mounting region and a contact region, such that the cells crush along a respective longitudinal axis when exposed to an impact force on the contact region, and wherein each of the longitudinal axes of the plurality of cells in the matrix structure diverges with respect to neighbouring cells in a direction from the mounting region to the contact region. This aspect of the invention allows the device to absorb energy from impacts at a range of angles.

In one embodiment, each of the cells of the device tapers outwardly in a direction from the mounting region to the contact region.

Each cell may include a mouth portion that is configured to encourage the cell to initially crush inwardly, towards its centre. The mouth portion may have an inverse taper. This advantageously encourages the cells to deform in the most effective way for absorbing energy.

In one embodiment, each cell is polymeric. Each cell may be fibre reinforced plastic. This embodiment of the invention has the advantage that the device is lightweight and strong.

In another embodiment, each cell is metallic. This embodiment of the invention has the advantage that the cell walls can be thin.

According to one embodiment, each cell is substantially identical. This allows the device to be manufactured relatively easily.

Each cell may be in contact with at least one neighbouring cell along a portion of its length. This embodiment of the invention has the advantage that the cells respond to an impact collectively, encouraging crushing as opposed to bending or buckling.

Each cell may be in contact with at least one neighbouring cell along a first portion of its length, but not in contact with any neighbouring cells along a second portion of its length. This embodiment has the advantage that each cell is independently crushable along a portion of its length, maintaining the rate of energy absorption throughout a crushing event.

In one embodiment, each cell has a portion that defines a cross-sectional profile comprising a combination of straight wall portions and curved wall portions arranged so as to ensure consistent crushing of the cell along its longitudinal axis.

The plurality of cells may be arranged such that their longitudinal axes converge at a common point of origin.

According to one embodiment, at least one of the cells is configured to cooperate with an attachment structure provided on a frame of the vehicle to mount the device to the frame. The at least one cell may protrude from the mounting region and is received by the attachment structure. These embodiments advantageously allow the device to be easily mounted onto a vehicle.

According to an aspect of the invention, there is provided a vehicle body component comprising an impact energy absorbing device.

According to a further aspect of the invention, there is provided a vehicle incorporating an impact energy absorbing device.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which:

FIG. 9 is a cross section view through the assembled mounting arrangement of FIG. 7;

FIG. 10 is a perspective view of a mounting cell of the impact energy absorbing device in FIGS. 6 and 7;

FIG. 12 is a view of an alternative embodiment; and

FIG. 13 is a view of a further alternative embodiment.

DETAILED DESCRIPTION

Figure 1:
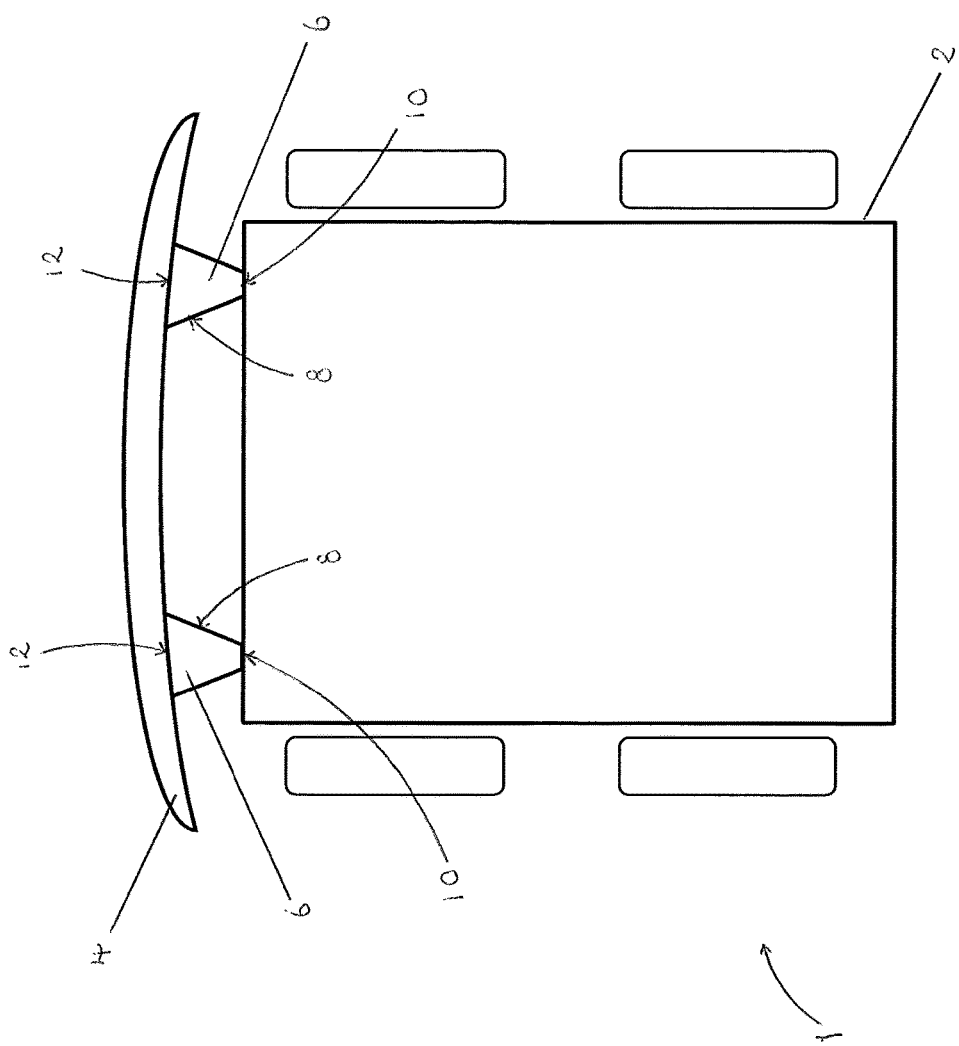
FIG. 1 is a schematic representation in plan view of a vehicle provided with an impact energy absorbing device in accordance with an embodiment of the invention.

Referring to FIG. 1, a part of a vehicle 1 is shown in schematic form comprising a structural frame 2, such as a monocoque or chassis, at the front of which is mounted a bumper 4, or fender. The bumper 4 is mounted to the structural frame 2 by way of two impact energy absorbing devices 6 located towards the right and left hand sides (in the orientation shown in the figures) of the bumper 4. The impact energy absorbing devices 6 will hereinafter be referred to simply as 'crash boxes' 6.

The arrangement of mounting a bumper 4 to a structural frame 2 using one or more crash boxes 6 is generally known in the art. As the skilled person will understand, in the event of a largely frontal impact on the bumper 4, the crash boxes 6 act to absorb a portion of the energy of the impact by deforming plastically; that is to say, by crushing. Less impact energy is therefore transferred into the structural frame 2 which means that there is less risk of damage to the various components of the structural frame 2. In this way, use of these crash boxes 6 in a sacrificial role serves to mitigate vehicle damage and the associated repair costs sustained during low speed impacts, which are typically below 15 km/h (approximately 9 mph).

It should be noted at this stage that the structural frame 2 depicted in FIG. 1 is simplified for the purposes of clarity and to avoid unnecessary detail obscuring the principle form of the invention. In practice, of course, many more components would be involved. Also, it should be noted here that it is known that crash boxes 6 may be used in parts of the vehicle 1 other than mounting bumpers 4 to the structural frame 2, for example between the engine cradle and bumper area.

As has been discussed above, known crash boxes are limited in their effectiveness at absorbing energy from angled impacts. However, crash boxes 6 in accordance with embodiments of the invention are beneficial in that their configuration ensures that energy from impacts at a much wider range of angles can be effectively absorbed, thereby providing greater protection to the structural frame 2 and, importantly, to the occupants of the vehicle 1.

In the following description, reference will be made to one of the crash boxes 6; it should, however, be appreciated that the description equally applies to the other of the crash boxes 6.

As can be seen in FIG. 1, the crash box 6 has a generally frustoconical outer profile 8 in plan view and, as such, extends from a relatively narrow mounting region 10, at which the crash box 6 is mounted to the structural frame 2, to a relatively wide contact region 12, at which the crash box 6 is attached to, supporting or otherwise in contact with the bumper 4.

As seen in FIG. 1, the profile of the contact region 12 is essentially flat. However, as will be explained, the configuration of the crash box 6 enables the contact region 12 to be formed into much more complex shapes if desired; for example, in order to accommodate complex inner surfaces of the vehicle 1 bodywork or bumpers.

Having described the overall form of the crash box 6 with reference to FIG. 1, it will now be described in more detail with reference to FIGS. 2 to 5.

Figure 2:
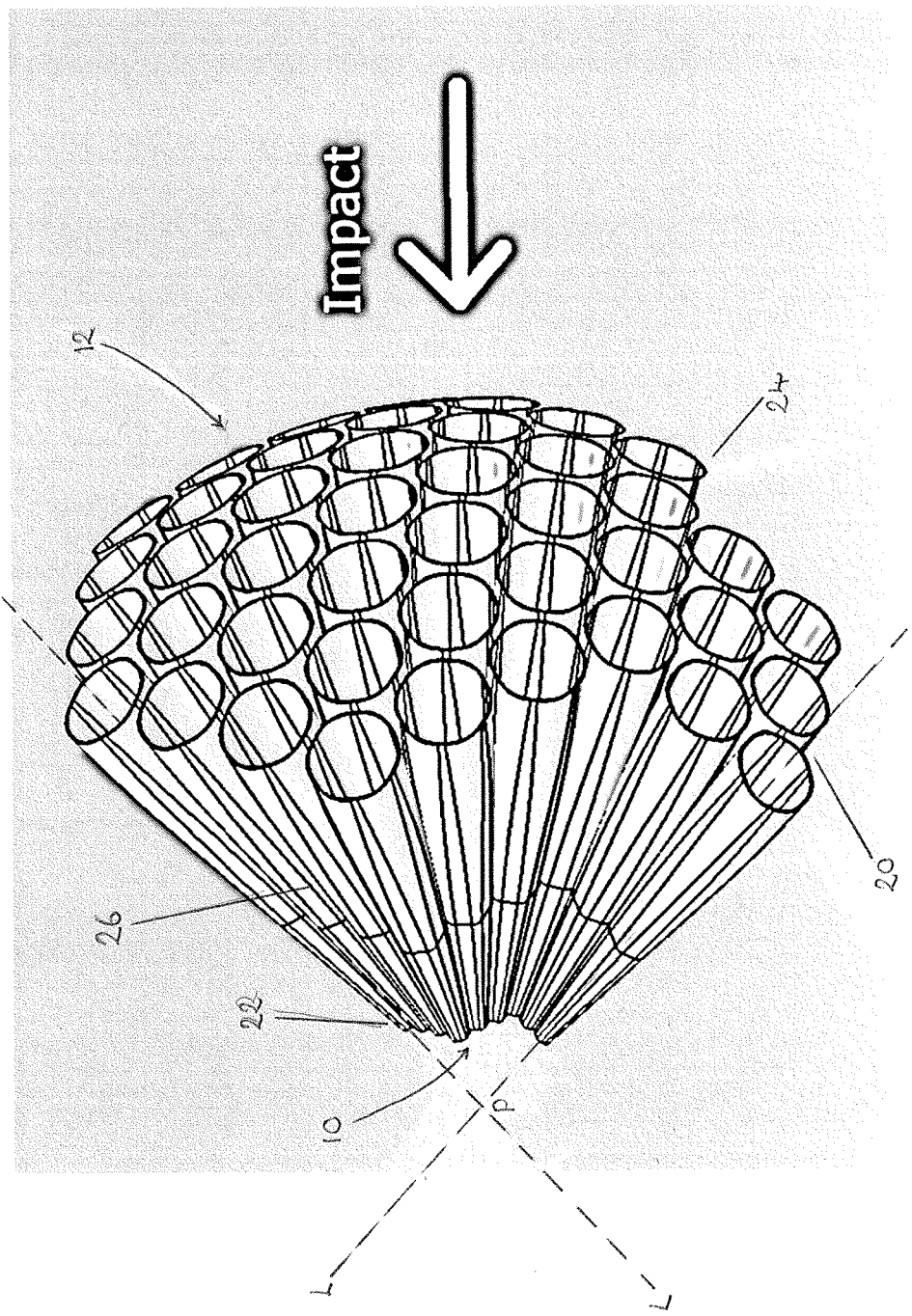
FIG. 2 is a perspective view of the impact energy absorbing device of FIG. 1, which is enlarged to show it in more detail.
Figure 3:
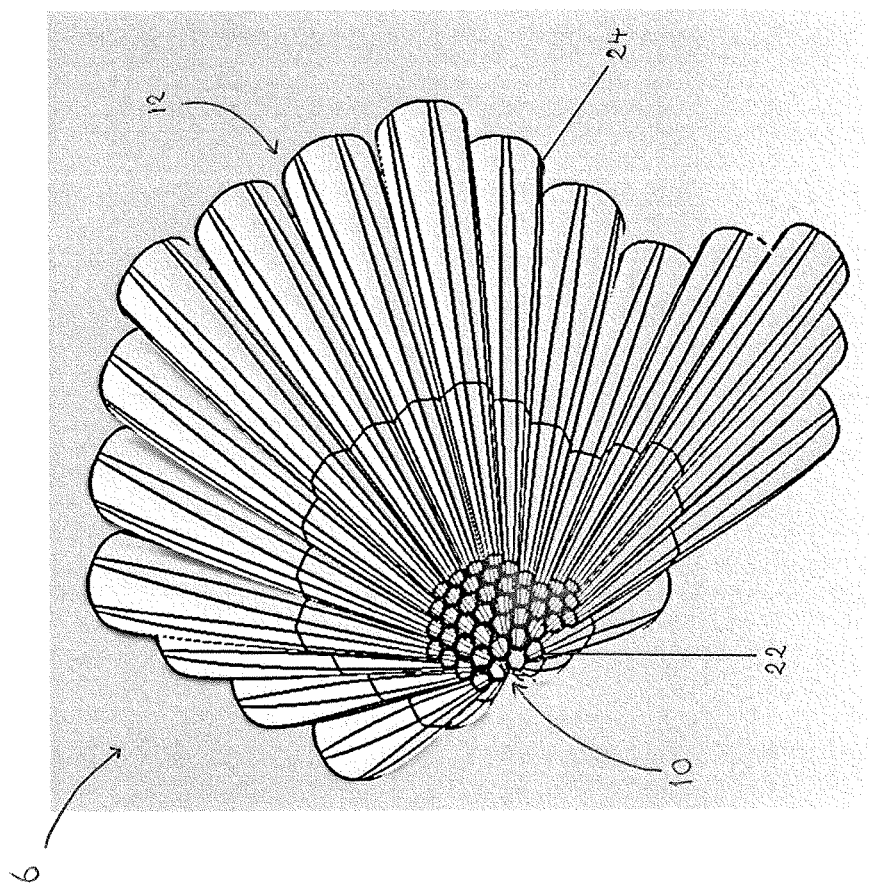
FIG. 3 is a perspective rear view of the impact energy absorbing device of FIG. 2.

Referring to FIGS. 2 and 3, the crash box 6 comprises a plurality of substantially identical cells 20 that are grouped together to form a matrix structure. Each of the cells 20 is generally conical and, as such, takes the form of a tapered tube having a 'root' or narrow end' 22, a 'mouth' or wide end 24 and a side wall 26 with a cross-section that is generally circular, but which varies along the length of the cell 20. As such, the crash box 6 comprises a plurality of self-stabilising closed section cells 20. Embodiments are also envisaged in which the cells have a non-circular cross section, i.e. polygonal.

As can be seen particularly well in FIG. 3, the cells 20 are clustered or grouped so that the narrow ends 22 of the cells 20 together effectively form a surface which defines the mounting region 10 of the crash box 6. The wide ends 24 of the cells 20 terminate to define a surface, seen particularly well in FIG. 2, which defines the contact region 12 of the crash box 6. The tapered form of each cell 20 permits a greater number of cells 20 to be accommodated within the space available for the crash box 6. This allows for greater energy absorption in the event of an impact, as will be explained in further detail below.

As mentioned above, by suitable configuration of the cells 20 the profile of the contact region 12 can be adapted to complement, conform to or accommodate the shape of any surface, for example the internal surface profile of a bumper, panel or other component of the vehicle 1 body. To this end, the dimensions and cross-sectional areas of the cells may 20 be selected as appropriate to provide a contact region 12 with an outer profile that matches curves of adjacent body parts of the vehicle 1, for example fenders, quarter-panels, bumpers, closures or doors. Since the cells 20 diverge significantly from one another, this structure enables the crash box 6 to undertake significant work by crushing in the event of an angled impact rather than simply deflecting or bending to one side, as may occur with existing crash boxes. This makes the crash box 6 a more efficient absorber of energy if such surfaces are struck, for example, by non-full-frontal impacts.

Each of the cells 20 has a longitudinal axis, two of which are shown in FIG. 2 by reference 'L'. The cells 20 are arranged such that the longitudinal axes 'L' diverge from a common point of origin 'P' that lies beyond the rear of the mounting region 10 of the crash box 6. Expressed another way, the longitudinal axes L of the cells are non-parallel.

In this particular embodiment, it can be seen that towards the wide end 24 of a cell 20, the side wall 26 is not contacted by any other cells 20 of the crash box 6, so towards the wide end 24 of each cell 20 acts in isolation and is independently crushable. The individual cells 20 respond by crushing when they are subjected to an impact along their longitudinal axis 'L' (or at slight inclinations to this angle). Specifically, the individual cells 20 absorb energy by axisymmetric collapse. In this example, the longitudinal axes 'L' are substantially normal to a local portion of the contact region 12 defined by the wide ends 24 of the cells 20. Therefore, the longitudinal axis 'L' of each cell is ostensibly aligned with the direction from which that cell will receive an impact.

When the cells 20 are considered as a whole, the crash box 6 is therefore capable of crushing in response to an impact from at least any angle encompassed by the range of the most divergent longitudinal axes 'L'. The larger the angle between the two most divergent longitudinal axes 'L', the wider the range of impact angles for which the crash box 6 works effectively. Thus, other embodiments envisage an increased number of cells 20 with a larger angle between the most divergent longitudinal axes 'L', making it effective across a wider range of impact angles.

Individually, each cell 20 has a small cross-sectional area at its narrow end or root 22 and would tend to bend if subjected to an impact at an inclination to its longitudinal axis 'L'. However, this is mitigated by the fact that towards the root 22 the cells 20 are necessarily arranged closer together due to their converging longitudinal axes 'L'. In the area adjacent the root 22 of each cell, the cells 20 are tightly packed and the side wall 26 of each cell 20 is in contact with the surface of at least one adjacent cell 20. Expressed another way, each cell 20 is in contact with at least one neighbouring cell 20 along a first portion of its length (towards the root 22), but is not in contact with any neighbouring cells 20 along a second portion of its length (towards the mouth 24). Thus, towards their roots 22, the clustered cells 20 offer one another lateral support and respond to an impact collectively. As such, the clustered cells 20 have a combined cross-sectional area that is relatively large and this encourages crushing, as opposed to bending.

By working together as a bundle, each cell 20 is required to do only a fraction of the work done by the whole crash box 6 in absorbing energy from an impact and therefore each cell need only have a thin side wall 26. For a metallic crash box 6 in accordance with an embodiment of the present invention, the side wall 26 may be less than 1 mm thick; for a polymeric device the side wall 26 may be less than 2 mm thick, although these dimensions are given purely by way of example as it will be appreciated are dependent upon the properties of the material chosen and the energy each cell 20 is intended to absorb. This advantageously allows crash boxes 6 in accordance with this embodiment of the invention to be lightweight in comparison to prior art devices.

The crash boxes 6 may be fabricated from any one of a variety of different materials and, in order to create the thin side walls 26, a variety of production techniques may be employed. For example, the cells 20 may be made from hydroformed steel or aluminium and welded or glued together. In another embodiment, the crash box 6 is polymeric and may be injection moulded, either as one piece or as separate cells 20 that are attached using an adhesive or resin. Thermal properties of different polymers could be exploited during production of the crash box 6, for example having cells 20 preformed with thermoplastic that allows the separate cells 20 to be fabricated, for example by injection moulding or blow moulding, and then heated to fix them together. Additionally or alternatively, some or all of the cells 20 may be formed individually or as one or more clusters by means of 3-D printing. It is also envisaged that the crash box 6 could be made from fibre reinforced plastic, in which case each cell could be fabricated using a prepreg material on a former and then heated so as to cure into a final form, following which a group of cells could be bonded together. Alternatively, dry fibres, for example carbon or glass, could be braided onto a removable mandrel to produce preformed shapes that are then resin infused in a suitable tool. This manufacturing method allows the use of longer reinforcing fibres and therefore facilitates higher energy absorption per unit weight. It is envisaged that the aforementioned alternatives of materials and forming techniques may be used in combination so as to produce a crash box 6 with optimised weight, size, strength and overall performance.

Figure 4:
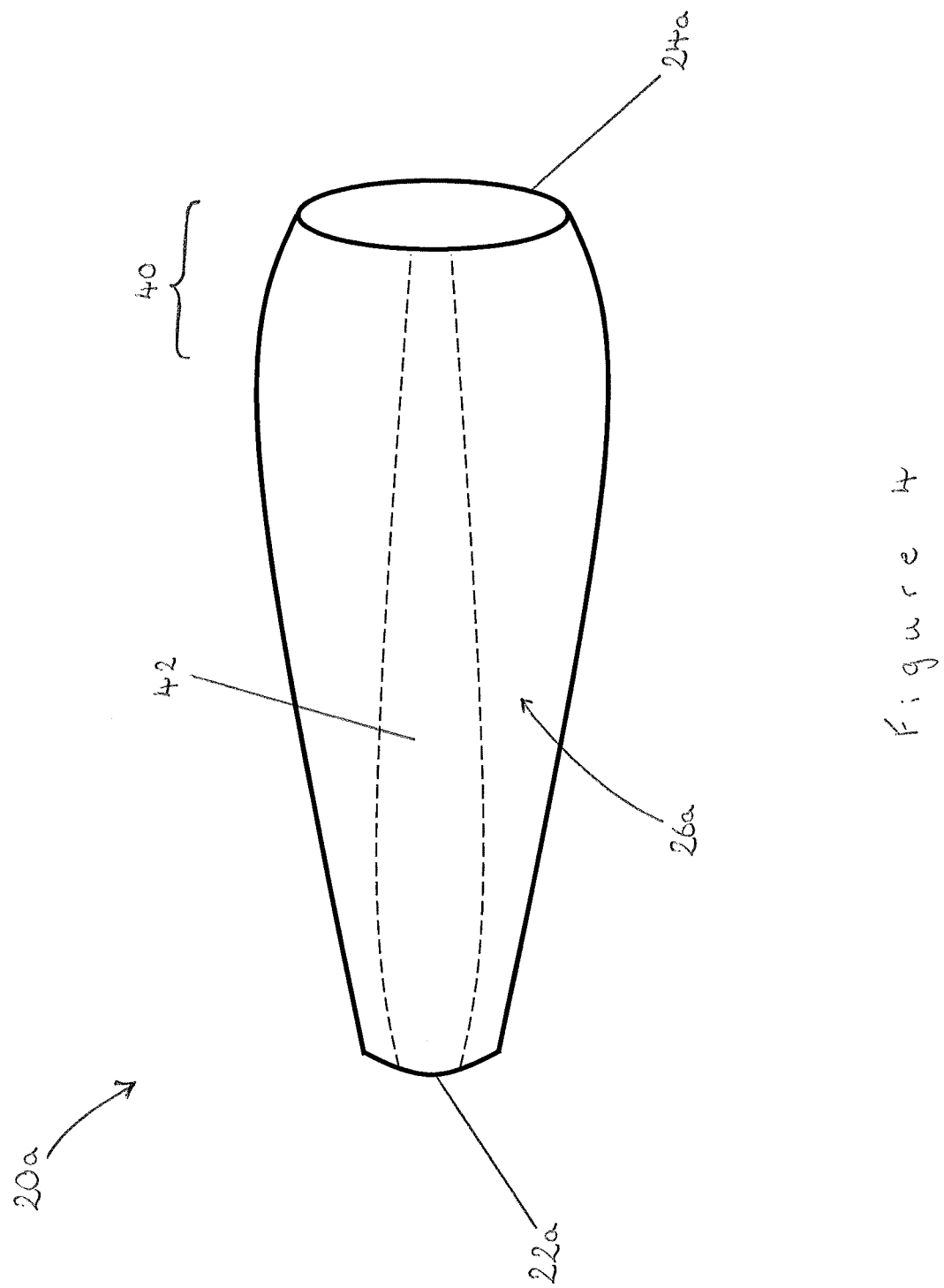
FIG. 4 is a schematic representation of one of the cells of the device of FIG. 2.

Having described the general form of the cells 20, reference will now be made to FIG. 4 which shows features of an individual cell 20a in more detail. In the following description, reference will be made to one individual cell 20a of the crash box 6; it should be noted however that, since the cells 20 are substantially identical, the description applies equally to any of the cells 20 of the crash box 6 shown in FIGS. 2 and 3. It should also be noted at this stage that FIG. 4 is a schematic representation of a cell 20a and is not to scale. Certain features have been exaggerated for clarity and as such this drawing should not be taken as a realistic representation of an individual cell 20a.

As can be seen in FIG. 4, a portion of the cell towards the mouth end, the 'mouth portion' 40, has an inverse taper in comparison to the rest of the length of the cell 20a. The inverse taper of the mouth portion 40 acts to encourage the cell 20a to initially collapse inwardly in response to an impact. This results in the cell 20a deforming in the most effective way for absorbing energy, for example by the crush being initiated at the mouth end 24a, rather than at some other point along the length of the cell 20a. This inward collapse is particularly beneficial for certain materials, especially fibre-reinforced polymers in which case the inward collapse of the cell 20 directs any split and delaminated fibres into the cavity of the cell 20. Here, the fibres are forced to rub against one another by the rearward intact remainder of the cell 20. This frictional interaction absorbs further energy.

In an alternative embodiment, the mouth portion 40 may be configured to have a uniform cross-section, that is to say, it may be parallel sided rather than inversely tapered. In a further embodiment, the taper of the mouth portion 40 of the cell 20a may simply be a continuation of the taper of the rest of the length of the cell 20a.

Along its length, the side wall 26a has at least one squared-off section or 'flat' 42 where the side wall 26a is straight, not curved. In cross section, the flat 42 corresponds to a straight wall section 42 of the side wall 26a. As can be seen in FIG. 4, the width of the flat 42 relative to the rest of the side wall 26a varies along the length of the cell 20a. Generally, the flat 42 takes up a comparatively larger proportion of the side wall 26a close to the root 22a and a comparatively smaller proportion close to the mouth 24a. Correspondingly, the cross-sectional profile of the cell 20a therefore varies along its length in the direction extending from the root 22a to the mouth 24a; the relative proportions of the straight and curved wall sections vary. Generally, the straight wall sections are comparatively wide close to the root 22*a* and comparatively narrow close to the mouth 24*a*.

The cross-sectional profile of the side wall 26*a* is arranged to ensure consistent crushing of the cell 20*a* along its longitudinal axis 'L'. For example, the width of the straight wall section is arranged to ensure adjacent cells 20 can contact one another near to the roots 22. It is this shaping of the cells 20 that means that the roots 22 of neighbouring cells 20 are in contact with one another, and that the mouths 24 are separate from one another, allowing the crash box 6 to respond to an impact by crushing with a controlled and predictable energy absorption rate.

Figure 5:
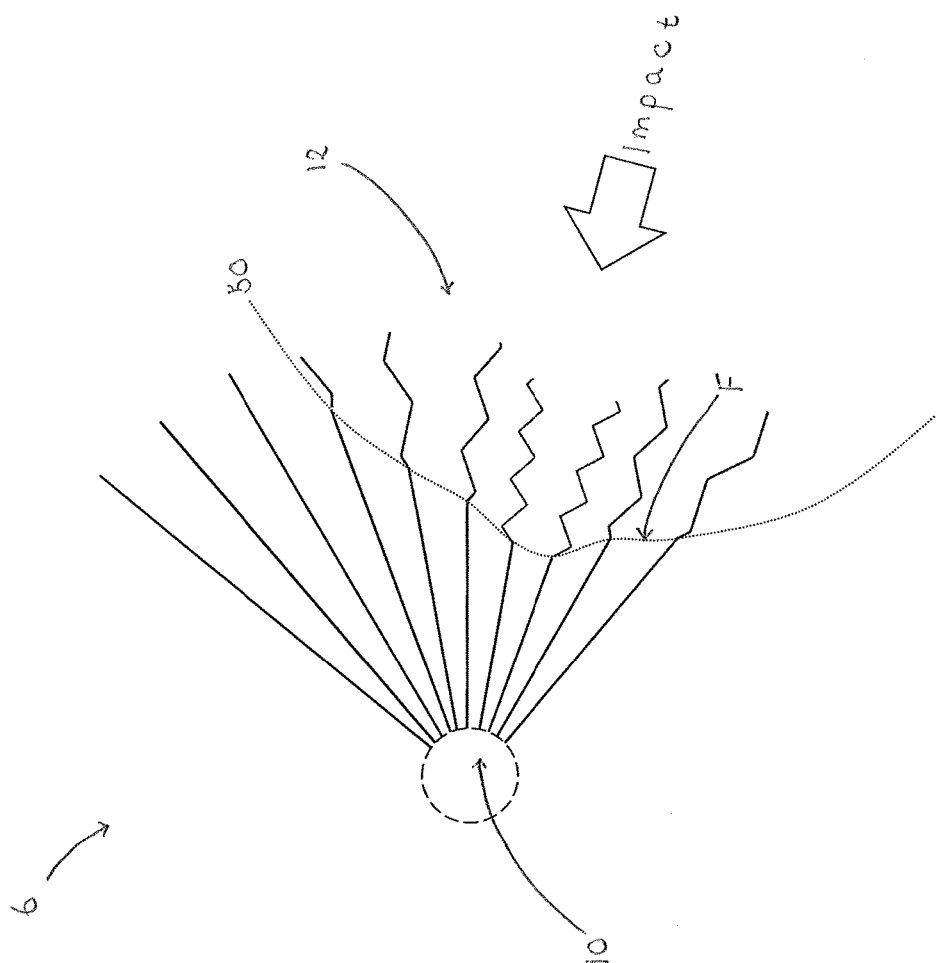
FIG. 5 is a schematic representation of an impact energy absorbing device in accordance with an embodiment of the invention undergoing crushing.

The operation of the impact energy absorbing device depicted in FIGS. 1 to 4 in response to an impact will now be described with reference to the schematic diagram of FIG. 5.

During a collision, an impact force is applied to the bumper 4 of the vehicle 1 and the energy is transferred to the contact region 12 of the crash box 6. The cells 20 are initially impacted at their wide ends or mouths 24, where the low curvature of the cross-sectional profiles of the side walls 26 promotes the initiation of a controlled crushing event.

At any moment in time during the crushing event, there is an imaginary continuous three dimensional surface 50 through the crash box 6 such that on one side of the surface 50 there lies material that has been crushed by the impact force and on the other side of the surface 50 there lies material that is yet to be crushed. There is an instantaneous intact profile of the crash box that lies on this surface: the 'crushing front' or 'annihilation front', marked on FIG. 5 as 'F'. Throughout a crushing event, the crushing front 'F' progresses through the crash box 6, from the contact region 12 towards the mounting region 10. The volume of material at the crushing front 'F' defines the amount of material that is crushing in response to the impact at that instant in time; so the more material at the crushing front 'F', the higher the rate of energy absorption of the crash box 6.

Towards their mouths 24, each cell 20 individually has a relatively large cross-section. Of course, as the crushing front 'F' progresses towards the roots 22, the cross-section of those impacted cells decreases. However, due to the increasing interdependence of the cells 20 towards their roots 22, throughout the crushing event more and more cells 20 begin to crush in response to the impact. The crushing front 'F' spreads out across the crash box 6 and the volume of material at the crushing front 'F' is significantly maintained. Therefore, the rate of energy absorption of the crash box 6 remains desirably stable and the crash box 6 performs continuous progressive energy absorption throughout the crushing event. Thus, the arrangement of individually tuned cells 20 which are combined in a matrix to produce the crash box 6 of the present invention, that is to say an energy absorbing device, may be readily configured for a given application, with energy absorption characteristics specifically tuned for the vehicle and loading for which it is intended.

FIGS. 1 to 5 illustrate the technical principles of a crash box 6 in accordance with the invention. However, the focus will now turn to a further embodiment, with reference to FIGS. 6 to 11, which may be considered to be a more practical realisation of the principles described above.

Figure 6:
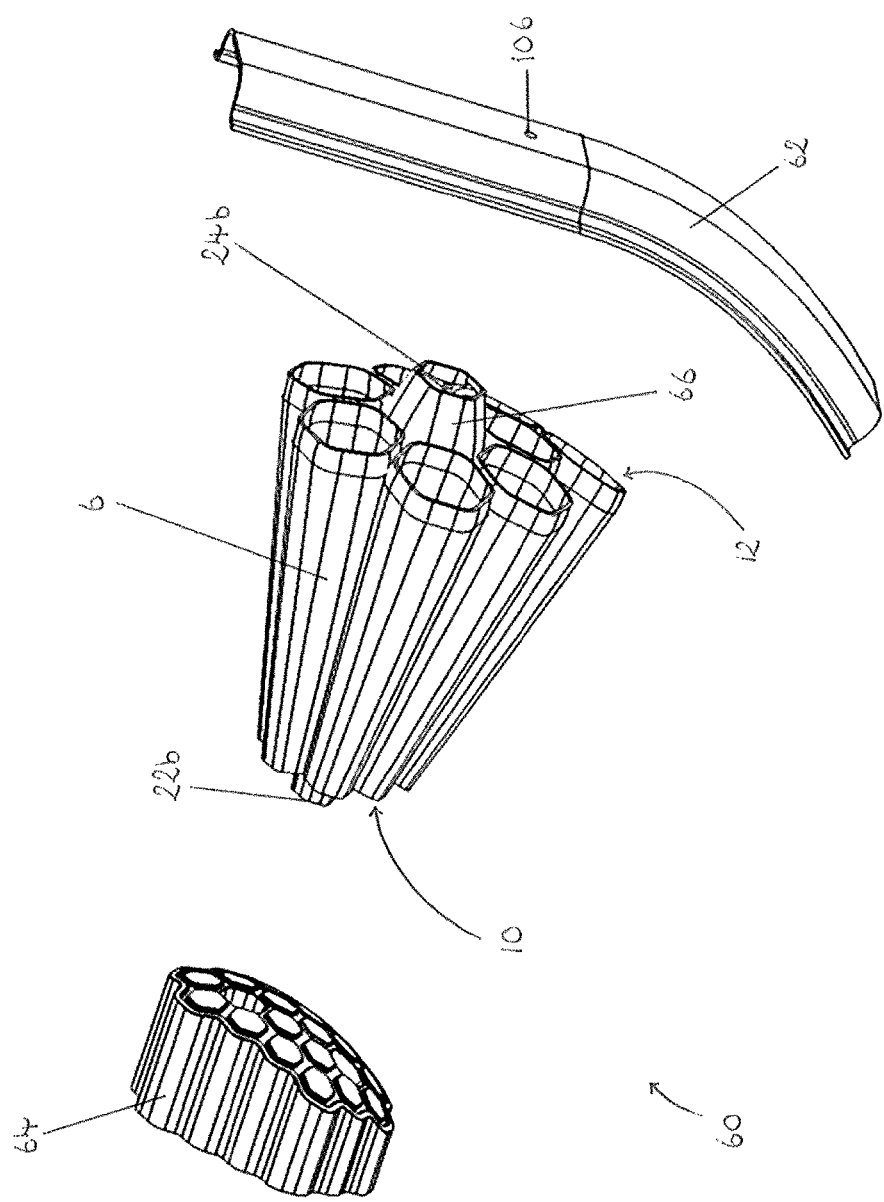
FIG. 6 is an exploded perspective view of a mounting arrangement incorporating an impact energy absorbing device in accordance with an embodiment of the invention.

Referring to FIG. 6, a mounting arrangement 60 of a vehicle body component 62 is shown, whereby the vehicle body component 62 is mounted onto a vehicle (not shown) by way of a crash box 6 in accordance with an embodiment of the invention. For the purposes of this discussion, the vehicle body component 62 can be considered to be a support structure 62 for a bumper 4 of a vehicle.

The mounting arrangement 60 comprises the support structure 62, the crash box 6 itself and an attachment structure in the form of a mounting block 64. Although not shown here, the mounting block 64 may be attached to, or be an integral part of, the structural frame. The mounting region 10 of the crash box 6 is attached to the mounting block 64 and the support structure 62 is secured in front of the contact region 12 of the crash box 6, in a manner that will be explained later. Note that the crash box 6 of this embodiment is very similar to the crash box 6 of the embodiment of FIGS. 1 to 5. Therefore, only the differences will be explained here for brevity.

Within the group of cells 20 of the crash box 6, one of the cells is adapted to serve as a mounting point. The 'mounting cell' is indicated in FIG. 6 by reference numeral 66. As such, the mounting cell 66 is longer than the other cells 20 of the crash box but is otherwise broadly similar to them, with the result that the root 22*b* of the mounting cell 66 protrudes from the mounting region 10 and its mouth 24*b* protrudes from the contact region 12. The mounting cell 66 allows the crash box 6 to couple to, or mate with, the mounting block 64.

Figure 7:
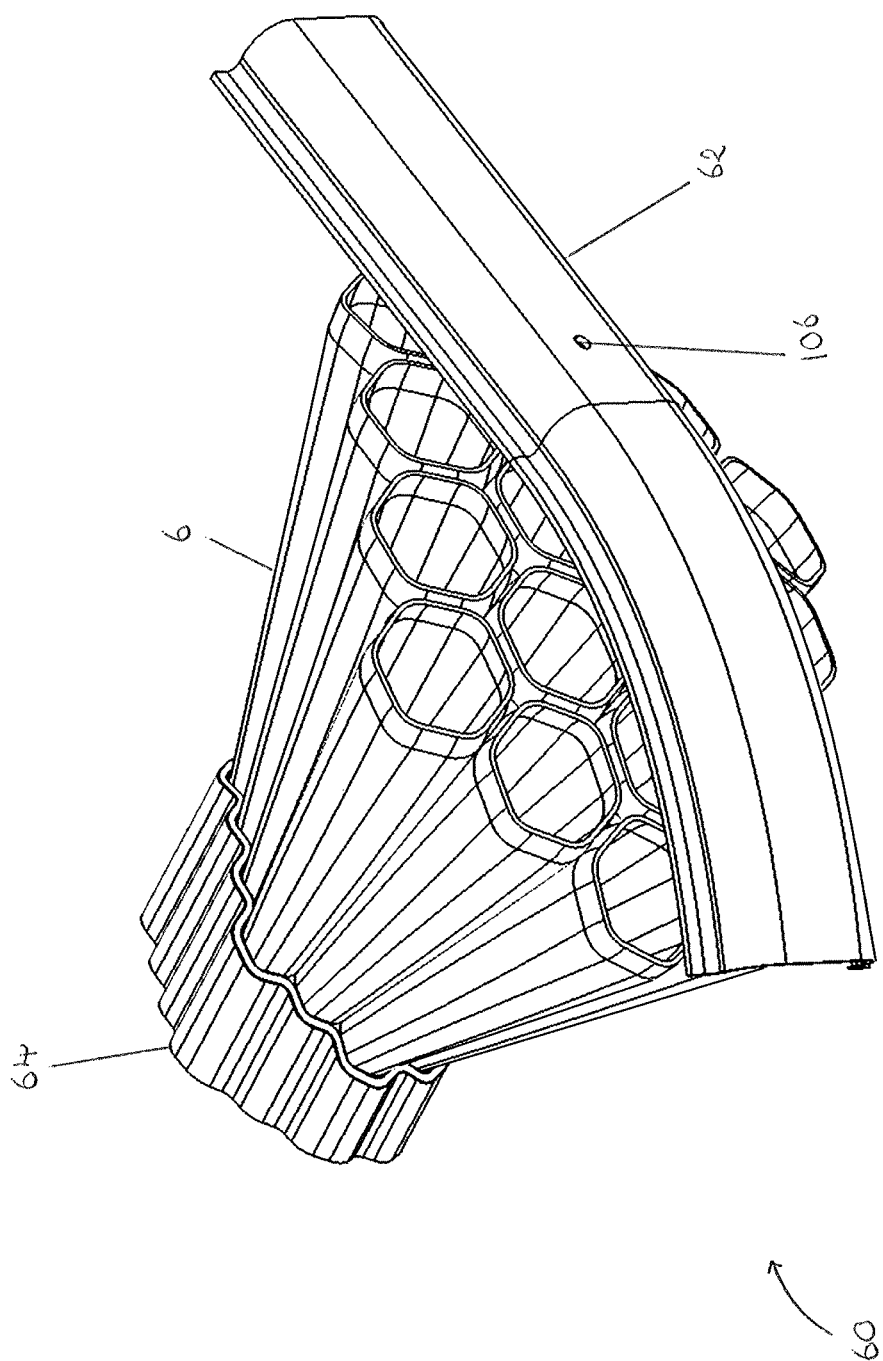
FIG. 7 is a perspective view of the mounting arrangement of FIG. 6 in assembled form.

The mounting block 64, the crash box 6 and the support structure 62 are shown in exploded configuration in FIG. 6, but are shown assembled in FIG. 7. Here, it can be seen that the crash box 6 is, in effect, sandwiched between the mounting block 64 and the support structure 62. This allows the crash box 6 to absorb impacts applied to the support structure 62 from across a range of angles without the support structure 62 detaching from the crash box 6. The position of the crash box 6 between the support structure 62 and the mounting block also allows the majority of the cells 20 of the crash box 6 to respond collectively to an impact applied to the support structure 62.

Figure 8:
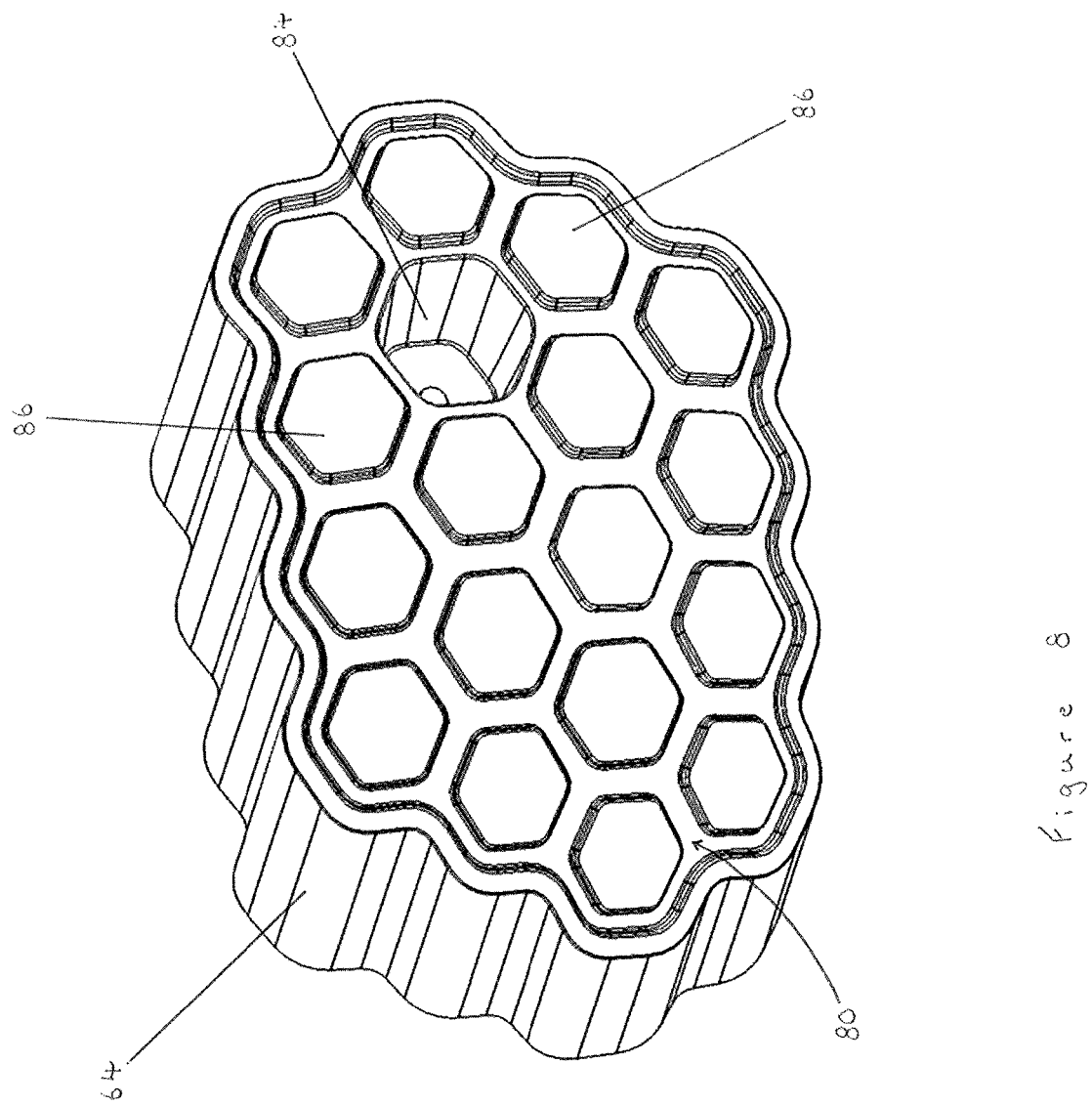
FIG. 8 is a perspective view of a mounting block of the mounting arrangement of FIG. 6.

The mounting block 64 is shown in more detail in FIG. 8 and, as can be seen, comprises a block having an upper surface 80 that defines an array of formations. Those formations are configured so as to complement the root ends 22 of the cells 20 of the crash box 6. In more detail, one of the formations is a frustoconical recess or 'socket' 84 having a polygonal profile to match that of the root end 22*b* of the mounting cell 66. More specifically, the polygon is a rounded hexagon.

Arranged about the socket 84, the other formations are in the form of short protrusions 86. The socket 84 and protrusions 86 are in a closely packed arrangement that corresponds to the relative spacing of the root ends 22 of the cells 20 of the crash box 6: the socket 84 corresponding to the position of the root end 22*b* of the mounting cell 66 and the protrusions, two of which are labelled in FIG. 8 as 86, each corresponding to a respective cell 20 of the crash box 6. The protrusions 86 are also shaped into rounded hexagons such that they match the shape and size of the narrow root ends 22 of the other cells 20, although their dimensions are such that they are received inside the open root ends 22 of the cells 20.

The mounting of the crash box 6 onto the mounting block 64 is shown more clearly in FIG. 9, in which it can be seen that the root 22*b* of the mounting cell 66 is received in the centrally positioned socket 84, and that the other cells 20 are located on respective protrusions 86. The socket 84 is of a suitable length so that when the mounting cell 66 is received inside the socket 84, the protrusions 86 are received inside the other cells 20, such that the mounting region 10 of the crash box 6 abuts the upper surface 80 of the mounting block 64. Thus, the mounting block 64 provides a secure mounting surface for the crash box 6.

Since the root 22b of the mounting cell 66 of the crash box 6 is received by the mounting block 64, the mounting arrangement locates the majority of the crash box 6 forwards of the mounting block 64. Thus, in the event of an impact being applied to the support structure 62, the majority of the crash box 6 crushes in response to the impact before the impact is transferred to the structural frame 2. Therefore, the majority of the material of the crash box 6 is used usefully to absorb energy during a crushing event without premature damage to the structural frame 2.

One way in which the mounting block 64, the crash box 6 and the support structure 62 may be held together will now be described with reference to FIGS. 9 to 11. Referring to FIG. 9, it will be appreciated that the crash box 6 is sandwiched between the support structure 62 and the mounting block 64 by mechanical fasteners 90, 91, such as bolts. The mounting cell 66 includes first and second inserts 92, 94 that serve to connect the mounting cell 66 to the support structure 62 and the mounting block 64, respectively.

As can be seen in FIG. 10, where the first insert 92 is shown in-situ, that first insert 92 is strut-like in form and will be referred to hereinafter as the strut insert 92. The strut insert 92 is provided inside the mouth 24b of the mounting cell 66.

Figure 11B:
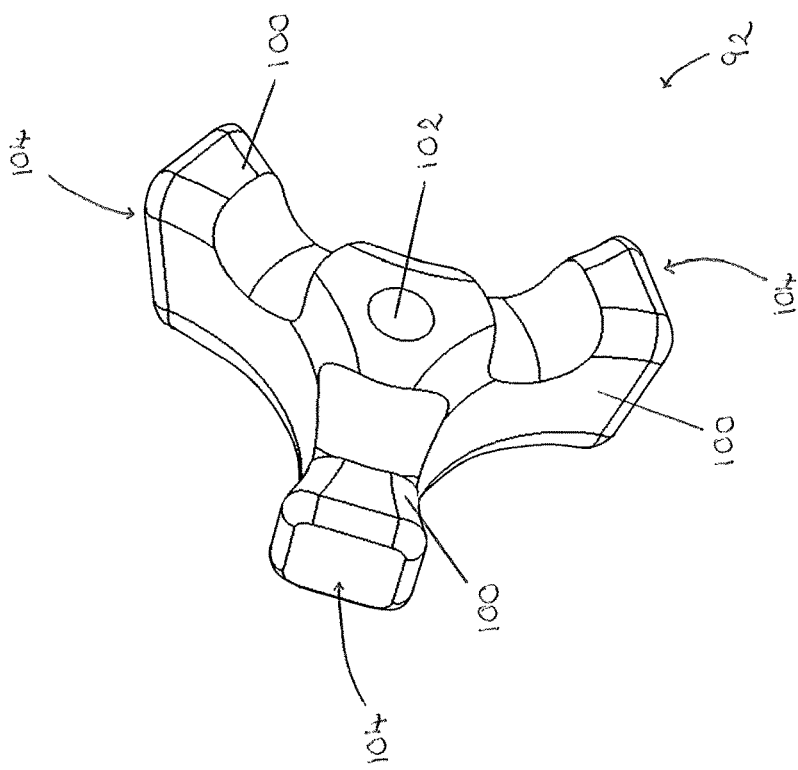
FIGS. 11a and 11b are perspective views from the front and rear, respectively, of an insert of the mounting cell of the device shown in FIGS. 6 and 7.
Figure 11A:
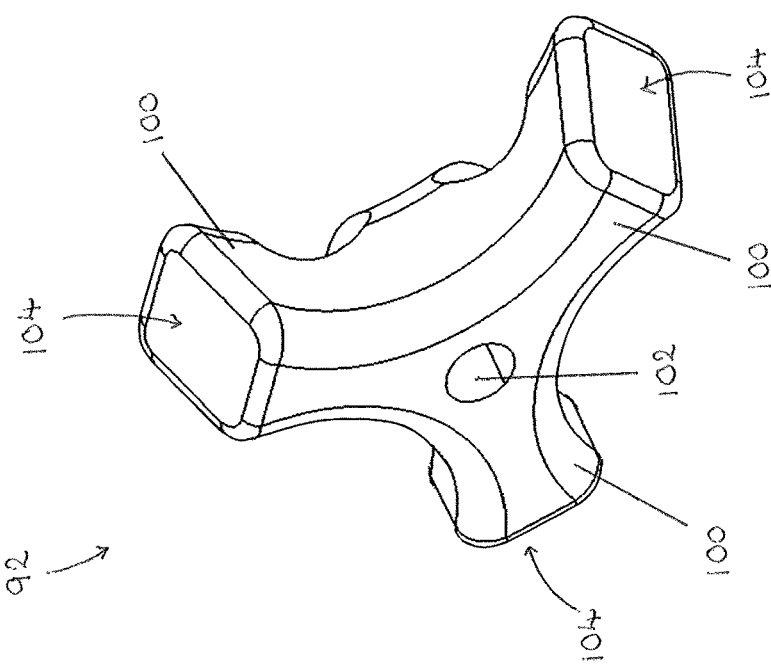

The 'strut insert' 92 is shown in more detail in FIGS. 11a and 11b. It has rotational symmetry of order three, with three equi-spaced arms 100 and a hole 102 at its centre to allow a mechanical fastener 90, such as a bolt or screw, to pass through it. The mounting cell 66 and the strut insert 92 are arranged such that the axis of rotational symmetry of the strut insert 92 and the longitudinal axis of the mounting cell 66 are coincident. The strut insert 92 is appropriately sized and shaped such that the surface 104 at the end of each arm 100 is in contact with the interior surface of the mounting cell 66.

The strut insert 92 is configured to interfere minimally with the crushing of the mounting cell 66 during a crushing event. The shape of the strut insert 92 encourages it to be pushed out of contact with the side wall 26b of the mounting cell 66 when an impact is applied. Additionally, the arms 100 include fracture initiators arranged to initiate fractures when a predetermined load is exceeded, encouraging the arms 100 to break off, should the strut insert 92 become engaged with the side wall 26b of the mounting cell 66.

The strut insert 92 serves to provide an anchoring point for the support structure 62 to fix onto the contact region 12 of the crash box 6. The support structure 62 comprises a hole 106 that corresponds to the size and location of the hole 102 in the centre of the strut insert 92. The support structure 62 can therefore be attached to the strut insert 92 by a bolt or screw 90, as is shown by FIG. 9. The strut insert 92 may be maneuvered into position inside the mouth 24b of the mounting cell 66 after the crash box 6 has been attached to the mounting block 64. When installed, the strut insert 62 clamps the mouth end 24b of the mounting cell 66 against the internal surface of the support structure 62. Thus, the support structure 62 is mounted to the vehicle by way of the crash box 6.

The second insert 94 is provided inside the root end 22b of the mounting cell 66 and takes the form of a plug, as such, this will be referred to hereinafter as the plug-insert 94. The plug-insert 94 serves as an anchoring point with which the root end 22b of the mounting cell 66 is able to be fixed to the mounting block 64. The plug-insert 94 is effectively wedged in the root end 22b of the mounting cell 66 and includes a sleeved through-bore 108 which receives a bolt 91. The plug-insert 94 may be moulded, from fibre-reinforced plastic, in place at the root end 22b of the mounting cell and the through-bore 108 may be realised as a metallic spacer tube moulded into the plug-insert 94. The bolt 91 passes through the bore 108 and into a reinforced flange or plug 110 defined at the base of the socket 84, which captures the shank of the bolt 91. In this manner, the mounting cell 66 is fixed to the mounting block 64.

The mounting cell 66 may be reinforced compared to the other cells 20 of the crash box 6 but, in order that at least a portion of the impact energy is effectively absorbed by the crash box 6 and not directly transferred to the frame 2, the mounting cell 66 is necessarily still crushable. In this embodiment, the mounting cell 66 is configured to allow the vehicle to be towed via a recovery point (not shown) on the support structure 62 should the vehicle become stuck or broken down. Therefore, the mounting cell 66 has a high tensile strength to endure the large tensile loading and associated stress applied during a snatch recovery, but has an appropriate compressive strength that allows it to crush in response to an impact exceeding a predetermined threshold. Therefore, the mounting arrangement allows the vehicle 1 to be snatch recovered without the crash boxes 6 detaching from the vehicle structural frame 2 or the support structure 62 detaching from the crash boxes 6.

The short protrusions 86 of the mounting block 64 help the crash box 6 to locate onto the mounting block 64, but are not essential. In alternative embodiments the other cells 20 may simply abut a flat upper surface 80 of the mounting block 64, or other cooperating structures may be provided. In further embodiments, more than one cell may be adapted to be a mounting cell 66 and therefore, the mounting block 64 may include more than one socket 84.

It will be appreciated by a person skilled in the art that the embodiments of the present invention described above could be modified to take many other alternative forms without departing from the inventive concept defined by the claims.

For example, in another embodiment, shown in FIG. 12, a crash box 6 is shown that has a similar configuration to those embodiments described above in the sense that it includes a matrix of tubular cells that taper outwardly from a mounting region 10 to a contact region 12. Moreover, longitudinal axes 'L' of the cells diverge in the same way as the previous embodiments. However, in this embodiment, the matrix-like structure is formed from a plurality of corrugated sheets or plates, two of which are labelled in FIG. 12 as 120, that are fixed together in such a way as to define a matrix of hexagonal tapered cones in a tessellating arrangement. Neighbouring corrugated plates 120 are joined together by welding at their mutual interfaces. This is shown in FIG. 12 by laser weld lines, one of which is labelled as 122. The configuration of the crush box 6 in this embodiment lends itself to be manufactured from suitable sheet material, such as sheet aluminium, although this does not preclude the use of other materials, such as plastics.

A crash box 6 of a further embodiment is illustrated in FIG. 13. As before, the crash box 6 is in the form of a matrix of tubular cells that taper outwardly, like a fan, from a mounting region 10 to a contact region 12. Again, it will be noted that longitudinal axes 'L' of the cells diverge in the same way as the previous embodiments. In this embodiment, however, each of the cells 20 is square in cross section and is connected to a neighbouring cell along its entire length. The configuration of this embodiment lends itself to being manufactured from plastics, for example by injection moulding, or additive manufacturing techniques.

In the embodiments described above, the longitudinal axes 'L' of the cells 20 all converge at a common point of origin 'P'. However, this need not be the case. For example, in one embodiment, the longitudinal axes may converge generally in a direction from the contact region towards the mounting region without sharing a common intersection point beyond the rear of the mounting region; that is to say there may be multiple intersection points. In other embodiments, the cells could be angled so that there are no points of intersection.

It should also be noted that although, in the embodiments described above, all of the cells 20 are tapered outwardly from the mounting region 10 to the contact region 12, it is envisaged that some embodiments may include cells that are not tapered in this way; for example, cells with a uniform cross-section along their length.

Furthermore, in the embodiments described above, each of the cells 20 of the crash box 6 is substantially identical. However, it should be noted that this need not be the case, and the crash box could be formed of dissimilar cells. For example, the precise structure of the cells could be configured to control the crush characteristics of the crash box at various points, which could be particularly advantageous if the crash box is to cover a larger surface area.

Additionally, although the device has been described in the context of a vehicle 1, it is envisaged as having other applications; for example, as a means of protecting articles during transportation.

The invention claimed is:

1. An impact energy absorbing device for a vehicle, the impact energy absorbing device comprising:
   a plurality of cells grouped together to form a matrix structure having a mounting region configured to mount the device to a structural frame of the vehicle, and a contact region configured, in use, to contact a bumper of the vehicle,
   wherein the matrix structure is configured such that each cell crushes along a respective longitudinal axis thereof when exposed to an impact force on the contact region, and
   wherein the longitudinal axes of the plurality of cells in the matrix structure diverge in a direction from the mounting region to the contact region,
   wherein each of the cells tapers outwardly in a direction from the mounting region to the contact region, and
   wherein each cell comprises a mouth portion that is configured to encourage the cell to crush inwardly, towards its center.

2. The impact energy absorbing device of claim 1, wherein the mouth portion has an inverse taper.

3. The impact energy absorbing device of claim 1, wherein each cell comprises polymeric material.

4. The impact energy absorbing device of claim 3, wherein each cell comprises fibre reinforced plastic.

5. The impact energy absorbing device of claim 1, wherein each cell comprises metallic material.

6. The impact energy absorbing device of claim 1, wherein each cell is substantially identical.

7. The impact energy absorbing device of claim 1, wherein each cell is in contact with at least one neighboring cell along a portion of its length.

8. The impact energy absorbing device of claim 7, wherein each cell is in contact with at least one neighboring cell along a first portion of its length, but is not in contact with any neighboring cells along a second portion of its length.

9. The impact energy absorbing device of claim 1, wherein each cell has a portion that defines a cross-sectional profile comprising a combination of straight wall portions and carved wall portions arranged so as to facilitate consistent crushing of the cell along its longitudinal axis.

10. The impact energy absorbing device of claim 9, wherein a width of the straight wall portions of each cell varies along a length of each cell.

11. The impact energy absorbing device of claim 9, wherein the straight wall portions narrow in width from the mounting region to adjacent the contact region.

12. The impact energy absorbing device of claim 1, wherein the plurality of cells are arranged such that their longitudinal axes converge at a common point of origin.

13. The impact energy absorbing device of claim 1, wherein at least one of the cells in the mounting region is configured to cooperate with an attachment structure provided on the frame of the vehicle to mount the device to the frame.

14. The impact energy absorbing device of claim 13, wherein the at least one of the cells in the mounting region protrudes from the mounting region and is received by the attachment structure.

15. A vehicle body component comprising the impact energy absorbing device of claim 1.

16. A vehicle comprising the vehicle body component of claim 15.

* * * * *